(12) United States Patent
Guidi

(10) Patent No.: US 10,060,394 B2
(45) Date of Patent: Aug. 28, 2018

(54) EVAPORATIVE SYSTEM

(71) Applicants: DENSO International America, Inc., Southfield, MI (US); DENSO CORPORATION, Kariya, Aichi-pref. (JP)

(72) Inventor: Paolo Guidi, Macomb, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 208 days.

(21) Appl. No.: 14/678,241

(22) Filed: Apr. 3, 2015

(65) Prior Publication Data

US 2016/0069304 A1    Mar. 10, 2016

Related U.S. Application Data

(60) Provisional application No. 62/048,567, filed on Sep. 10, 2014.

(51) Int. Cl.
*F02M 33/02* (2006.01)
*F02M 25/08* (2006.01)
(Continued)

(52) U.S. Cl.
CPC .... *F02M 25/0836* (2013.01); *F02M 25/0705* (2013.01); *F02M 25/0809* (2013.01); *F02M 25/089* (2013.01); *G01M 15/09* (2013.01)

(58) Field of Classification Search
CPC ........... F02M 25/0705; F02M 25/0809; F02M 25/0836; F02M 25/089; F02M 25/0854;
(Continued)

(56) References Cited

U.S. PATENT DOCUMENTS 4,264,961 A * 4/1981 Nishimura ............ F02D 41/187
 123/494
4,506,594 A * 3/1985 Rowland ................ B64D 13/04
 137/486
(Continued)

FOREIGN PATENT DOCUMENTS

EP     0777041 A2 *  6/1997     ............. F01M 11/10
JP     09177530 A  *  7/1997
JP     2009-257738 A    11/2009

OTHER PUBLICATIONS

International Search Report and Written Opinion dated Dec. 9, 2015 in corresponding PCT Application No. PCT/JP2015/004508.

*Primary Examiner* — Marguerite McMahon
*Assistant Examiner* — Tea Holbrook

(57) ABSTRACT

An evaporative system is for an internal combustion engine. The internal combustion engine has an intake pipe equipped with a supercharger to pressurize intake air. The evaporative system includes an ejector, an ejector passage, and a pressure sensor. The ejector is to draw intake airflow from a downstream of the supercharger to an upstream of the supercharger to cause a negative pressure to draw fuel vapor into the upstream of the supercharger. The ejector passage is branched from the downstream of the supercharger and is returned through the ejector to the upstream of the supercharger. The pressure sensor is communicated with the ejector passage to detect pressure in the ejector passage.

8 Claims, 8 Drawing Sheets

(51) Int. Cl.
*F02M 25/07* (2006.01)
*G01M 15/09* (2006.01)

(58) Field of Classification Search
CPC ......... F02M 25/0872; F02M 35/10157; F02M 21/047; F02M 19/086; G01M 15/09; G01M 3/2815; F02D 41/26; G01F 1/44; G01F 1/34; G01F 1/88; F02B 37/16
See application file for complete search history.

(56) References Cited

U.S. PATENT DOCUMENTS

| | | | |
|---|---|---|---|
| 2004/0006978 A1* | 1/2004 | Beck | F01N 3/021 60/289 |
| 2006/0266072 A1* | 11/2006 | Takeuchi | F25B 40/00 62/500 |
| 2007/0095400 A1* | 5/2007 | Bergquist | F16K 7/14 137/485 |
| 2011/0132331 A1* | 6/2011 | Pursifull | F02B 37/127 123/478 |
| 2013/0133631 A1* | 5/2013 | Graze, Jr. | F02M 26/47 123/568.11 |
| 2013/0220282 A1* | 8/2013 | Hadre | F02M 25/0809 123/520 |
| 2013/0233287 A1* | 9/2013 | Leone | F02M 25/08 123/520 |
| 2013/0276766 A1* | 10/2013 | Subramanian | F02D 41/0077 123/568.21 |
| 2014/0069534 A1* | 3/2014 | Cunningham | F02M 35/10229 137/557 |
| 2014/0081549 A1* | 3/2014 | Rollinger | F01M 13/00 701/101 |
| 2014/0081564 A1* | 3/2014 | Pursifull | F02M 35/10222 701/113 |
| 2014/0196694 A1* | 7/2014 | Euliss | F02M 25/08 123/520 |
| 2014/0251284 A1* | 9/2014 | Plymale | F02M 25/089 123/518 |
| 2014/0311602 A1* | 10/2014 | Jefford | F16K 15/186 137/899 |
| 2014/0345574 A1* | 11/2014 | Haefele | F02M 25/0809 123/519 |
| 2015/0158477 A1* | 6/2015 | Luehrsen | B60T 13/72 701/22 |
| 2015/0176542 A1* | 6/2015 | Balsdon | F02M 25/0836 137/888 |
| 2016/0061124 A1* | 3/2016 | Pflug | F02D 41/004 701/103 |
| 2016/0341155 A1* | 11/2016 | Dudar | F02M 25/0836 |

* cited by examiner

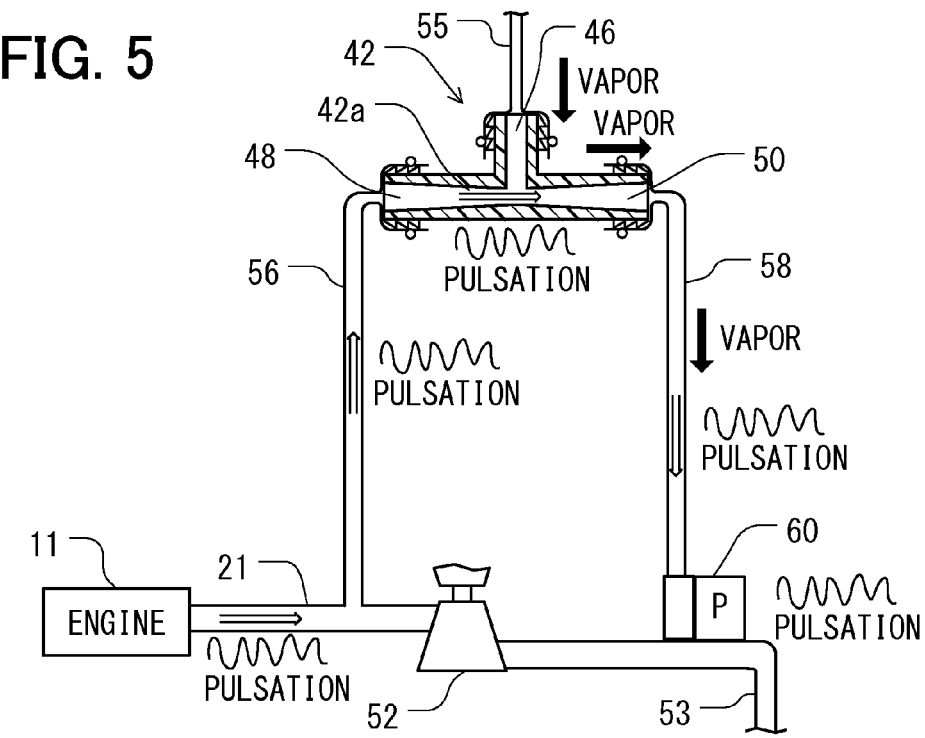
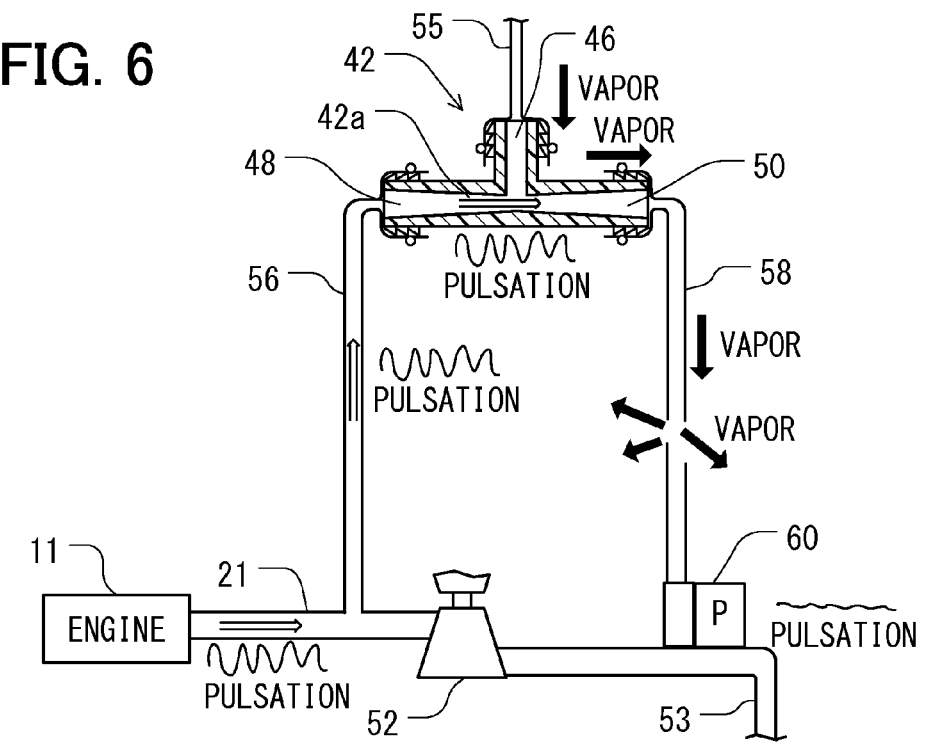

US 10,060,394 B2

EVAPORATIVE SYSTEM

CROSS-REFERENCE TO RELATED APPLICATION

The application claims the benefit of U.S. Provisional Application No. 62/048,567, filed on Sep. 10, 2014. The entire disclosures of the above application are incorporated herein by reference.

TECHNICAL FIELD

The present disclosure relates to an evaporative system for an internal combustion engine.

BACKGROUND

Conventionally, an internal combustion engine may be equipped with an evaporative system. The evaporative system may include a fuel vapor canister accommodating a charcoal filler to absorb fuel vapor produced in a fuel tank. The evaporative system may be configured to send the absorbed fuel vapor into an intake manifold of the engine thereby to burn the absorbed fuel vapor in combustion chambers of the engine. In this way, the evaporative system may restrict fuel vapor produced in a fuel tank from escaping as fuel vapor emission to the atmosphere. The evaporative system may include a transmission system such as a ejector to draw absorbed fuel vapor from the fuel vapor canister into the combustion chambers of the engine. It may be conceivable that the transmission system may have a failure such as breakage in its conductive passage to cause leakage of fuel vapor therethrough.

SUMMARY

The present disclosure addresses the above-described concerns.

According to an aspect of the preset disclosure, an evaporative system is for an internal combustion engine, the internal combustion engine having an intake pipe equipped with a supercharger to pressurize intake air. The evaporative system comprises an ejector configured to draw intake airflow from a downstream of the supercharger to an upstream of the supercharger to cause a negative pressure to draw fuel vapor into the upstream of the supercharger. The evaporative system further comprises an ejector passage branched from the downstream of the supercharger and returned through the ejector to the upstream of the supercharger. The evaporative system further comprises a pressure sensor communicated with the ejector passage and configured to detect pressure in the ejector passage.

According to another aspect of the preset disclosure, a pressure sensor is for an evaporative system for an internal combustion engine, the internal combustion engine having an intake pipe equipped with a supercharger. The pressure sensor comprises a detection port fluidly communicated with an ejector passage, the ejector passage branched from a downstream of the supercharger and returned to an upstream of the supercharger to cause a negative pressure and to draw fuel vapor into the upstream of the supercharger. The pressure sensor further comprises a pressure sensor element fluidly communicated with the detection port and configured to detect pulsation in pressure in the ejector passage.

BRIEF DESCRIPTION OF THE DRAWINGS

The above and other objects, features and advantages of the present invention will become more apparent from the following detailed description made with reference to the accompanying drawings. In the drawings:

FIG. 5 is a diagram showing the evaporative system in a normal state;
FIG. 6 is a diagram showing the evaporative system in a failure state.

DETAILED DESCRIPTION

First Embodiment

As follows, a first embodiment of the present disclosure will be described with reference to drawings.

Figure 1:
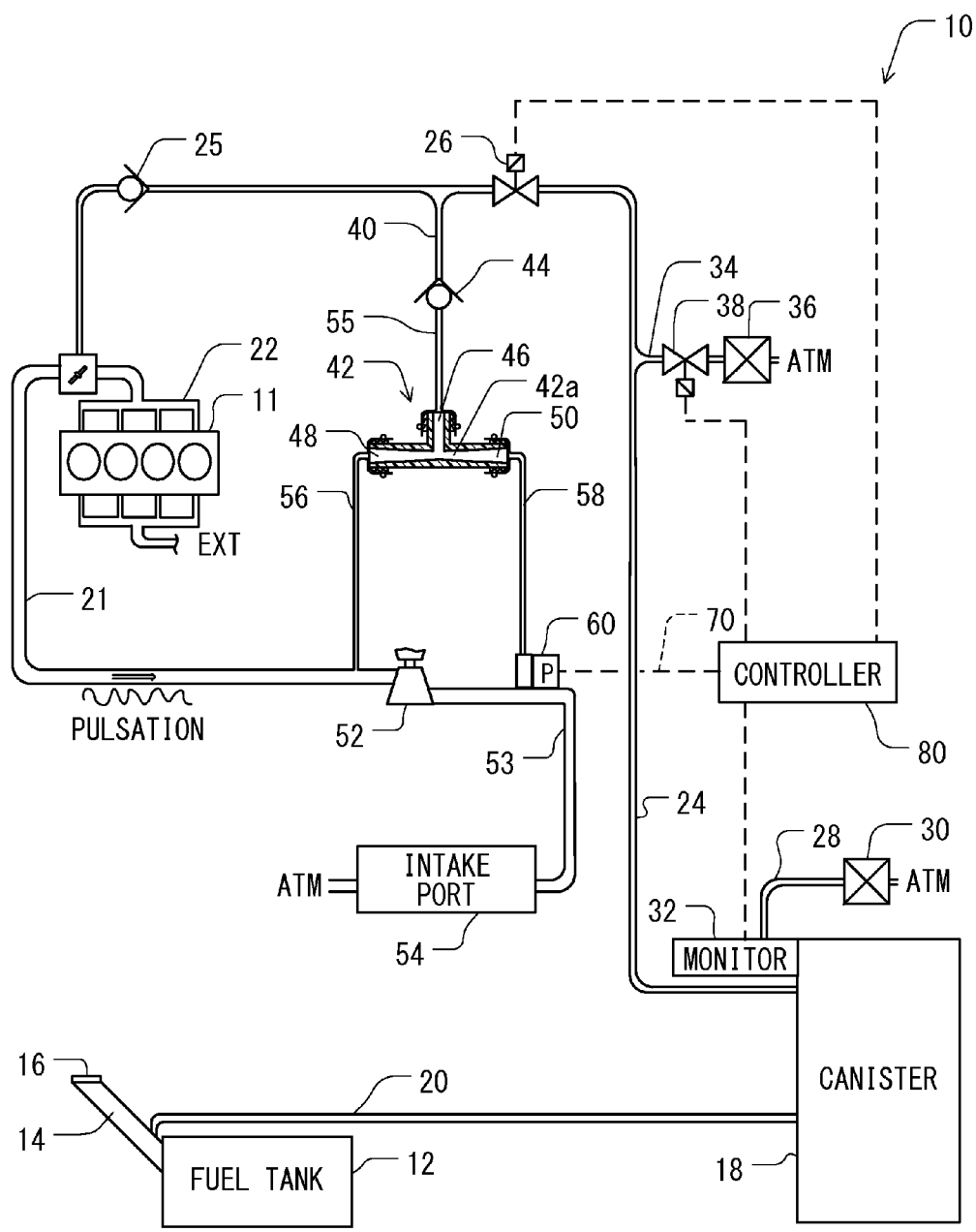
FIG. 1 is a diagram showing an evaporative system according to a first embodiment.

In FIG. 1, an evaporative emission control system (evaporative system) 10 is equipped to an internal combustion engine 11. In the present example, the engine 11 is a four-cylinder engine including four combustion cylinders. The engine 11 is equipped with an intake system to draw intake air through the intake system. The engine 11 is further equipped with an exhaust system (not shown) to exhaust combustion gas therethrough.

The intake system includes an intake manifold 22, an intake pipe 21, a supercharger 52, an intake pipe 53, and an air intake port 54, which are connected in series. The intake manifold 22 is connected to the combustion chambers of the engine 11. The intake pipe 21 is coupled with the intake manifold 22 and is coupled with an outlet side of the supercharger 52. The supercharger 52 may be a turbocharger to pressurize intake air by utilizing an exhaust gas flow. Alternatively, the supercharger 52 may be a charging device to pressurize intake air by utilizing an output power of the engine 11. The intake pipe 53 is equipped to an inlet side of the supercharger 52 and is coupled with the air intake port 54. The air intake port 54 is communicated with the atmosphere. The air intake port 54 may accommodate an air cleaning filer.

A fuel tank 12 includes a fueling tube 14 sealed by a cap 16. The fuel tank 12 is fluidly coupled to a fuel vapor canister 18 through a vapor conduit 20. The fuel vapor canister 18 contains absorbent such as carbon charcoal. The fuel vapor canister 18 is fluidly coupled to the intake manifold 22 through a canister conduit 24. A purge valve 26 is equipped in the canister conduit 24 for selectively blocking both the fuel vapor canister 18 and the fuel tank 12 from the intake manifold 22 and an ejector 42. The purge valve 26 is, for example, equipped with a solenoid actuator. The canister conduit 24 further includes a check valve 25. The check valve 25 restricts fluid such as fuel vapor from reverse-flowing from the intake manifold 22 to the fuel vapor canister 18. A vent line 28 is coupled to the fuel vapor canister 18. The vent line 28 extends to a filter 30. The filter 30 communicates with the atmosphere. An evaporative system monitor (ESM) 32 is equipped between the fuel vapor canister 18 and the filter 30.

A vacuum bypass conduit 34 is branched from the canister conduit 24 at a first location between the purge valve 26 and the fuel vapor canister 18. The canister conduit 24 extends to a filter 36. The filter 36 communicates with the atmosphere. A bypass valve 38 is equipped in the vacuum bypass conduit 34. The bypass valve 38 is, for example, equipped with a solenoid actuator. The bypass valve 38 selectively blocks both the fuel vapor canister 18 and fuel tank 12 from the filter 36.

An ejector conduit 40 is branched from the canister conduit 24 at a second location between the intake manifold 22 and the purge valve 26. The ejector conduit 40 is connected to a vacuum conduit 55 through a check valve 44. The vacuum conduit 55 is connected to the ejector 42. The check valve 44 restricts fluid such as fuel vapor from reverse-flowing from the ejector 42 to the intake manifold 22 and the fuel vapor canister 18 through the vacuum conduit 55 and the ejector conduit 40. The ejector 42 has a first port 46, a second port 48, and a third port 50. The ejector 42 forms a venturi passage 42a between the first port 46 and the third port 50. The venturi passage 42a has a reduced channel midway therethough to cause vacuum (negative pressure) at the reduced channel when conducting fluid such as intake air. The ejector 42 may be formed of various materials such as resin and/or metal.

The first port 46 is in fluid connection with the vacuum conduit 55. The second port 48 is in fluid connection with the intake pipe 21 through a feeding conduit 56. The intake pipe 21 is an outlet of the supercharger 52 and is located at the downstream of the supercharger 52. The third port 50 is in fluid connection with the intake pipe 53 through a return conduit 58. The intake pipe 53 is an inlet of the supercharger 52 and is located at the upstream of the supercharger 52.

Each of the vacuum conduit 55, the feeding conduit 56, and the return conduit 58 may be a hosepipe formed of an elastic material such as rubber and/or resin.

In the present example, each of the ports 46, 48, 50 has a knurled coupler on its outer periphery, and the knurled coupler is coupled with corresponding one of the hoses 55, 56, 58. Each of the hoses 55, 56, 58 is equipped with a circular clip on its outer periphery. In another example, the ports 46, 48, 50 may have various coupler configurations such as a barbed connection, a screwed connection, a swaged connection, and/or a crimped connection with corresponding one of the hoses 55, 56, 58. The ports 46, 48, 50 may be monolithic with corresponding one of the hoses 55, 56, 58.

At least one of the feeding conduit 56, the venturi passage 42a, and the return conduit 58 may form an ejector passage. The ejector 42 may be formed of a material, such as an engineering plastic.

The evaporative system 10 further includes a controller 80. The controller 80 is electrically communicated with the purge valve 26, the bypass valve 38, the ESM 32, and a pressure sensor 60. The controller 80 may include a computer including, for example, a processor, a storage device, and an IO device. The storage device is, for example, a non-transitory computer readable medium storing a software program. The software program is configured to determine whether the engine 11 is de-activated or activated, to control the purge valve 26 and the bypass valve 38, and to execute a failure determination processing described later. The software program is further configured to read a state of a vacuum switch of the ESM 32 representing whether the ESM 32 is functioning properly during a condition in which the engine 11 is de-activated. The software program is further configured to set a malfunction indicator to notify an occupant of necessity to repair the evaporative system 10.

Subsequently, one operation of the evaporative system 10 will be described with reference to FIGS. 2 to 4. In the present example, the operation includes a vacuum purge mode, a boost purge mode, and an ESM test mode.

Figure 2:
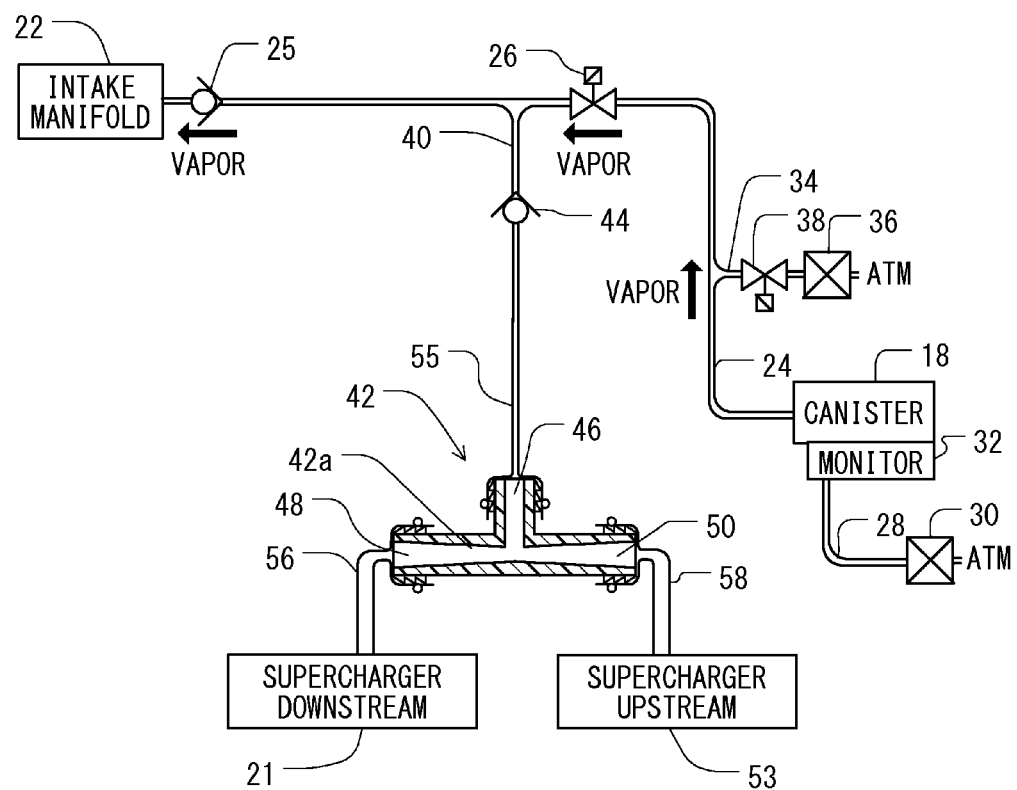
FIG. 2 is a diagram showing the evaporative system in a vacuum purge mode.

In the vacuum purge mode shown in FIG. 2, the supercharger 52 is not operational, and the engine 11 is operational to create a vacuum (negative pressure) in the intake manifold 22. The vacuum in the intake manifold 22 draws vapor from the fuel vapor canister 18 through the canister conduit 24 to cause the engine 11 to burn the drawn fuel vapor. In the vacuum purge mode, the controller 80 opens the purge valve 26 and closes the bypass valve 38. In addition, the vacuum switch in the ESM 32 is closed. The present state causes the check valve 44 to be pulled and closed thereby to restrict air flow from the ejector 42. The vacuum purge mode is a default operating mode of the engine 11 and the evaporative system 10.

Figure 3:
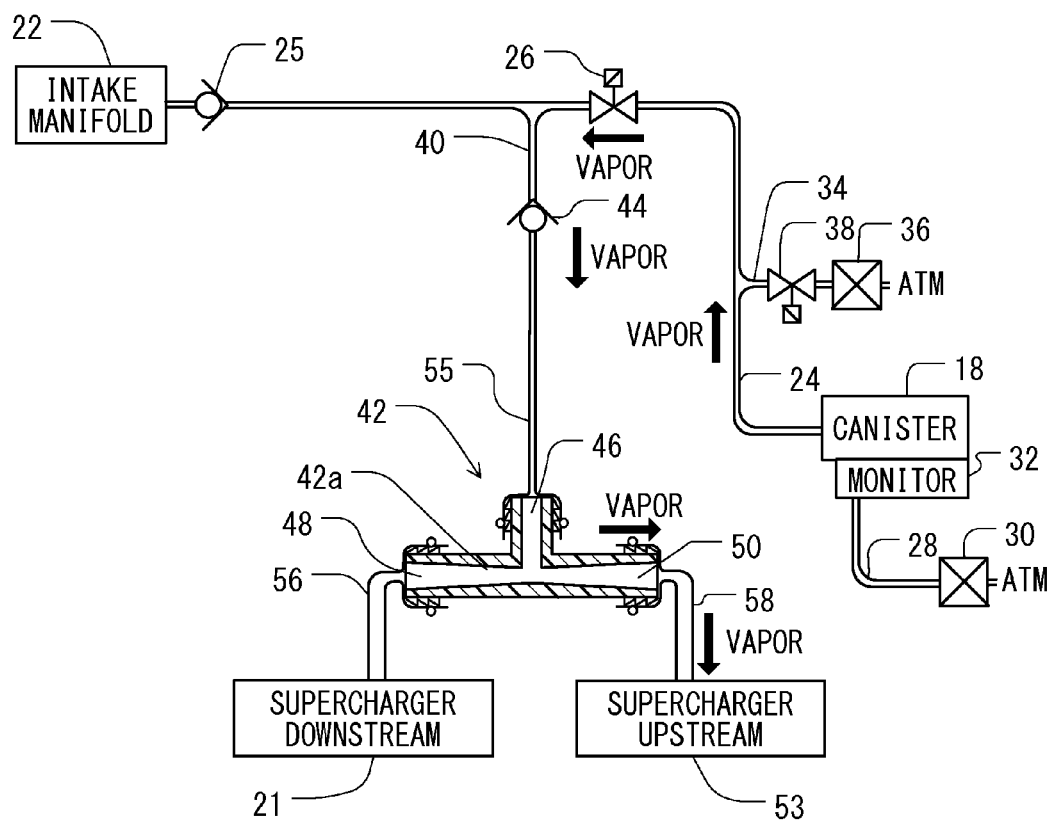
FIG. 3 is a diagram showing the evaporative system in a boost purge mode.

In the boost purge mode shown in FIG. 3, the supercharger 52 is placed in operation. In addition, the controller 80 opens the purge valve 26 and closes the bypass valve 38. In addition, the vacuum switch in the ESM 32 is closed. The operation of the supercharger 52 causes airflow from the air intake port 54 through the supercharger 52 into the intake manifold 22 thereby to create high pressure in the intake manifold. The check valve 25 is closed under application of the high pressure, thereby to restrict reverse-flow. The airflow caused by the supercharger 52 causes airflow through the feeding conduit 56, the second port 48, the venturi passage 42a, and the third port 50 of the ejector 42, and the return conduit 58. The airflow through the ejector 42 creates a venturi effect to cause a differential pressure in the venturi passage 42a thereby to create a vacuum (negative pressure) in the first port 46. The present vacuum causes fuel vapor to flow from the fuel vapor canister 18 through the canister conduit 24, the purge valve 26, the ejector conduit 40, the check valve 44, and the vacuum conduit 55 into the ejector 42. In this way, the fuel vapor from the fuel vapor canister 18 is supplied to the upstream of the supercharger 52 through the first port 46, the venturi passage 42a, the third port 50 of the ejector 42, and the return conduit 58. The supplied fuel vapor is drawn by the supercharger 52 into the intake manifold 22 and burned in the engine 11.

Figure 4:
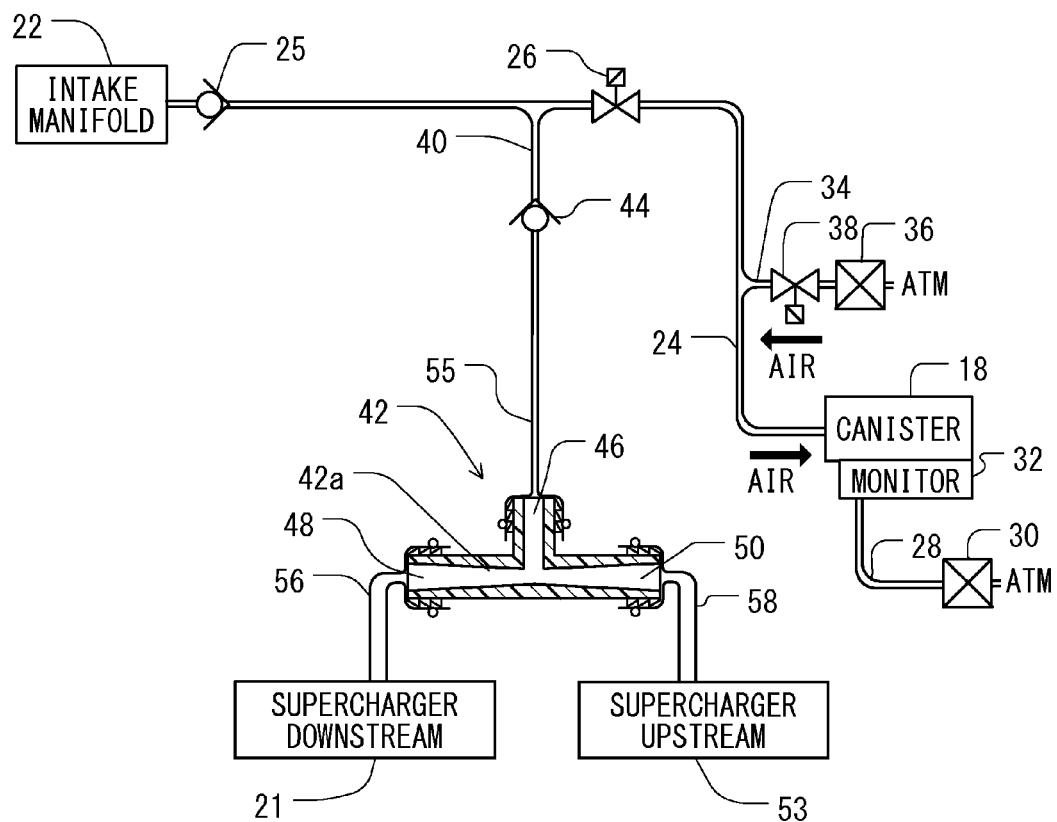
FIG. 4 is a diagram showing the evaporative system in an ESM test mode.

In the ESM test mode shown in FIG. 4, the engine 11 is not in operation. That is, the ESM test mode is in the key-off condition. In the key-off condition, the vacuum switch in the ESM 32 is closed by a residual vacuum in the system following activation of the engine 11. Thus, the ESM 32 seals the vent line 28. If the evaporative system 10 does not have a leakage, the pressure within the evaporative system 10, that is, within the fuel vapor canister 18, may go negative due to either cool down from operating temperatures or during diurnal ambient temperature cycling. When negative pressure is present within the evaporative system 10, the controller 80 closes the purge valve 26 and opens the bypass valve 38 thereby to start testing of the functionality of the ESM 32. The opening of the bypass valve 38 causes airflow through the filter 36 and the vacuum bypass conduit 34 into the fuel vapor canister 18 to relieve the vacuum within the fuel vapor canister 18.

In an exemplary embodiment, the controller 80 is configured to receive a signal indicating whether the vacuum switch of the ESM 32 toggles from closed to open when the vacuum in the fuel vapor canister reaches a predetermined level after the bypass valve 38 is opened. When the signal indicates that the vacuum switch of the ESM 32 be toggled from closed to open, the controller 80 determines that the ESM 32 functions properly. If the ESM 32 does not toggle to open, the controller 80 determines that the ESM 32 has a malfunction. In case of the malfunction, the controller 80 may cause a malfunction indicator to prompt an occupant to repair the system. The controller may include a non-transitory computer readable medium for testing the functionality of the ESM as discussed above.

Referring back to FIG. 1, the pressure sensor 60 is equipped to the ejector passage. According to the present first embodiment, the pressure sensor 60 is equipped to the return conduit 58 and is fluidly communicated with the return conduit 58.

As described above, in the boost purge mode, the purge valve 26 opens, and the supercharger 52 is operational to draw fuel vapor from the fuel vapor canister 18 into the ejector 42. In this way, the fuel vapor from the fuel vapor canister 18 is drawn into the ejector 42 to flow through the return conduit 58 into the intake pipe 53. The pressure sensor 60 is applied with pressure of the drawn fuel vapor passing through the return conduit 58.

FIGS. 1 and 5 show the evaporative system 10 in a normal state without a failure. As shown in FIGS. 1 and 5, when the engine 11 is operational, each of the four cylinders of the engine 11 implements a four-stroke operation, which involves an intake stroke, a compression stroke, a combustion stroke, and an exhaust stroke. The four cylinders implement the four-stroke operations at different timings thereby to cause pulsations in pressure of intake air at the different timings. The pulsation propagates through the intake manifold 22, the intake pipe 21, and the feeding conduit 56 into the ejector 42. The pulsation further propagates through the second port 48, the venturi passage 42a, the third port 50, and the return conduit 58 into the pressure sensor 60. Thus, the pressure sensor 60 detects the pulsation propagated from the four cylinders of the engine 11.

FIG. 6 shows an example of a failure state of the evaporative system 10. The failure may be caused by detachment of the coupling among the feeding conduit 56, the ejector 42, and/or the return conduit 58. Alternatively or in addition, the failure may be caused by breakage of the return conduit 58. In the example, breakage occurs in the return conduit 58 to leak fuel vapor through the breakage. In the present state, fuel vapor in the return conduit 58 is less capable to propagate the pulsation to the pressure sensor 60. Therefore, the pulsation propagated to the pressure sensor 60 is less intense compared with the pulsation in the normal state. The failure may be caused by breakage of the feeding conduit 56. In this case, fuel vapor in the feeding conduit 56 is less capable to propagate the pulsation to the pressure sensor 60 through the return conduit 58. Therefore, even in this case, the pulsation propagated to the pressure sensor 60 is less intense compared with the pulsation in the normal state.

Figure 7:
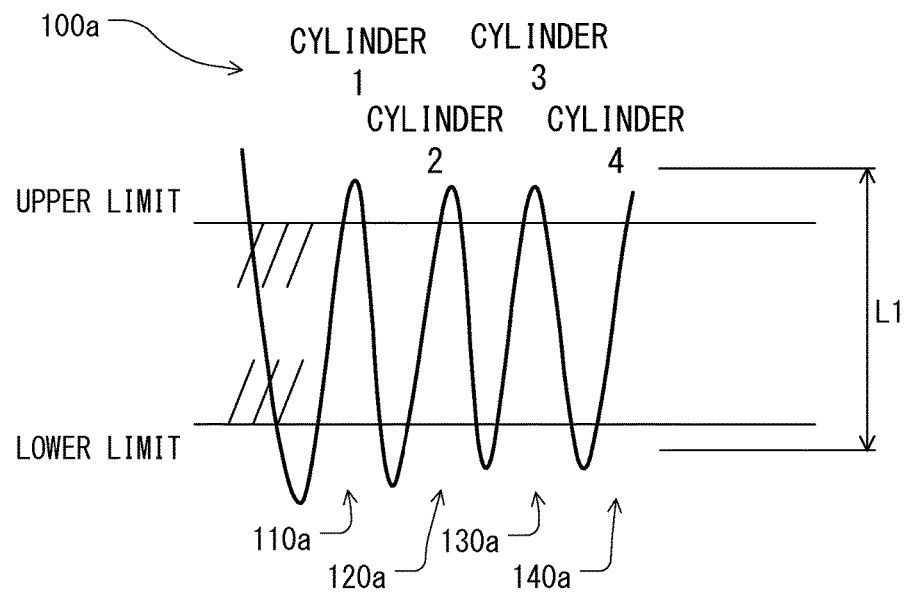
FIG. 7 is a wave diagram showing an example of a pulsation in a normal state.
Figure 8:
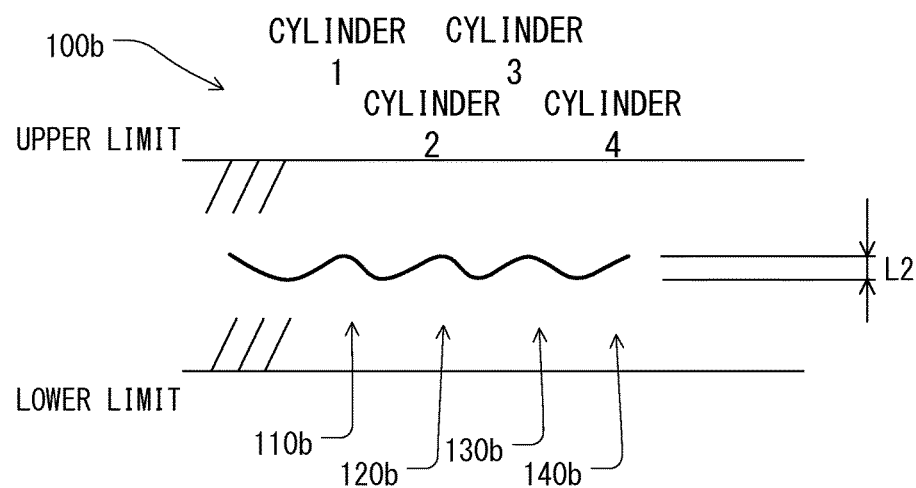
FIG. 8 is a wave diagram showing an example of a pulsation in a failure state.

Each of FIGS. 7 and 8 shows examples of the pulsation detected with the pressure sensor 60. In the examples, the detected pulsation is simplified to include four pulses corresponding to a first cylinder, a second cylinder, a third cylinder, and a fourth cylinder of the four cylinders of the engine 11. In the examples, each of the pulses is a V-shaped pulse having an upper peak and a lower peak between its amplitude. Actual pulsation may be in a further complicated form being an aggregation of various waves at various orders.

FIG. 7 shows an example of a pulsation 100a in the normal state. Specifically, in the normal state, the feeding conduit 56, the ejector 42, and/or the return conduit 58 has no failure and substantially causes no leakage. In the normal state, each of pulses 110a, 120a, 130a, 140a has an amplitude, which is about an amplitude L1. In addition, each of the pulses 110a, 120a, 130a, 140a has an upper peak greater than an upper limit. In addition, each of the pulses 110a, 120a, 130a, 140a has a lower peak less than a lower limit.

FIG. 8 shows an example of a pulsation 100b in the failure state. In the failure state, the pulsation may be damped and attenuated due to the leakage. In the present example, in the failure state, each of the pulses 110b, 120b, 130b, 140b has an amplitude, which is about an amplitude L2. The amplitude L2 is less than the amplitude L1. In the failure mode, each of the pulses 110b, 120b, 130b, 140b has an upper peak less than the upper limit. In addition, each of the pulses 110b, 120b, 130b, 140b has a lower peak greater than the lower limit.

The pressure sensor 60 detects the pulsation and sends the detection signal representing the detected pulsation to the controller 80. The controller 80 receives the detection signal and determines whether the present state is the normal state or the failure state according to the detection signal.

Figure 9:
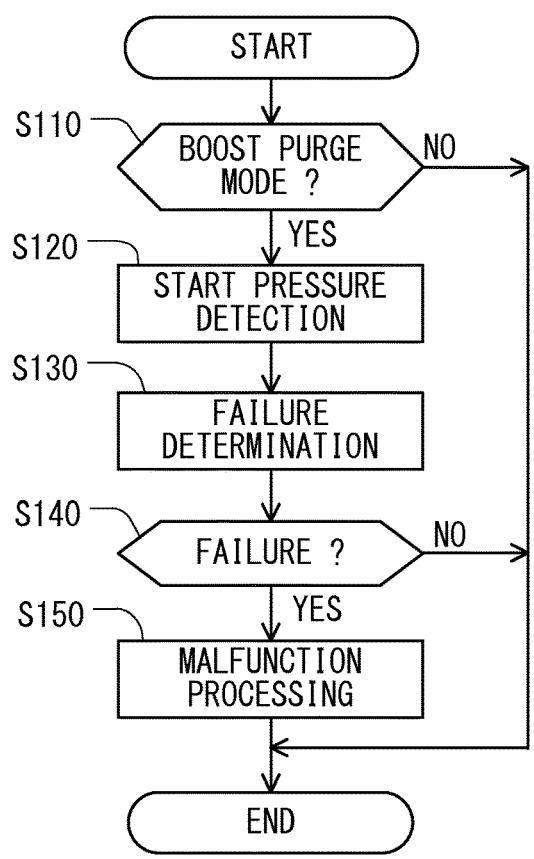
FIG. 9 is a flowchart showing a failure determination processing.

Subsequently, an example of a failure determination processing for determining the failure state will be described with reference to FIG. 9. The processing is, for example, coded as a software program and may be stored in the storage device (non-transitory computer readable medium) of the controller 80. The processing is executed by the controller 80 at a predetermined interval such as 1 second.

At S110, the controller 80 determines whether the present mode is the boost purge mode. On positive determination at S110, the controller 80 starts to sample the detected pressure from the pressure sensor 60 at S120.

Subsequently, at S130, the controller 80 determines whether the present state is the normal state or the failure state according to the sampled detected pressure. Specifically, the controller 80 may determine that the present state is the failure state in a condition where the amplitude of the pulsation is less than an amplitude threshold. The determination whether the present state is the normal state or the failure state may be made further in consideration of additional determination whether the upper peak of the pulsation is less than the upper limit and/or additional determination whether the lower peak of the pulsation is greater than the lower limit.

For example, when the engine is in operation at a low load, the amplitude of the pulsation may become small accordingly. Alternatively, when the engine is in operation at a high load, the amplitude of the pulsation may become high accordingly. Therefore, the controller 80 may store data map defining various values of the amplitude thresholds corresponding to various engine operation states and may employ adequate one of the values according to the present engine operation state. The amplitude may be at least one representative amplitude extracted from amplitudes of pulses in the pulsation. In addition, the controller 80 may store data map defining various values of the upper limits and/or the lower limits corresponding to various engine operation states. The data map may be obtained by benchmarking pulsation profiles under various engine operation states.

At S140, when the controller 80 determines that the present state is the failure state, the controller 80 may execute a malfunction processing. For example, in case of the failure state, the controller 80 may activate a malfunction indicator to prompt an occupant to repair the system. The controller 80 may store the failure state in the storage device. The controller 80 may transmit information representing the failure state to an external facility such as a data center. The controller 80 may limit or reduce performance of the engine 11 to restrict or reduce leakage of fuel vapor.

As described above, according to the present embodiment, the pressure sensor 60 is equipped to the return conduit 58 on the downstream side of the ejector 42. In addition, the controller 80 is configured to determine whether the failure mode occurs according to the detection signal sent from the pressure sensor 60. Thus, the present system enables determination whether leakage of vapor from the fuel vapor canister 18 occurs due to the detachment and/or the breakage of the ejector 42 and/or the return conduit 58.

In the determination at S130, the pulsation may vary in dependence upon various factors, such as an operating state of the engine, variation in cylinder characteristics, and/or external factor, such as a climate, a road condition, and/or a condition of an external device other than the evaporative system 10. Therefore, various conditions for the determination of the failure state may be employed in consideration of the various factors.

Figure 10:
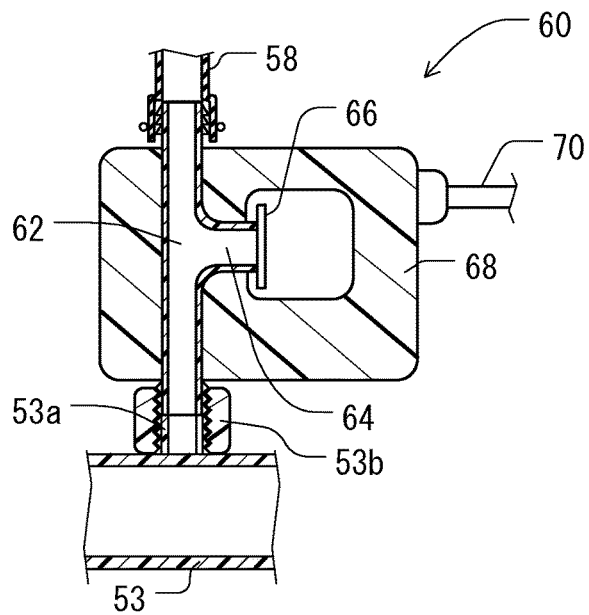
FIG. 10 is a diagram showing a pressure sensor according to the first embodiment.

As follows, an example of the structure of the pressure sensor 60 according to the present first embodiment will be described. As shown in FIG. 10, the pressure sensor 60 includes a body 68 having a manifold conduit 62 and accommodating a pressure sensor element 66. The pressure sensor element 66 is fluidly coupled to the manifold conduit 62 through a detection port 64. The pressure sensor element 66 is configured to detect pressure in the manifold conduit 62 and to generate an electric signal according to the detected pressure. In the present example, the pressure sensor element 66 is a diaphragm-type sensor. The pressure sensor element 66 may employ various configurations, such as a wire resistance strain gauge, a capacitive transformer, and/or a piezo-semiconductor. The pressure sensor element 66 is electrically connected with an electric wiring 70. The electric wiring 70 is electrically connected to the controller 80. Thus, the controller 80 is configured to receive an electric signal as the detection signal from the pressure sensor element 66 thereby to acquire the detected pressure.

The manifold conduit 62 has a knurled coupler on its outer periphery at one side (upper side in drawing), and the knurled coupler is coupled with the return conduit 58. The return conduit 58 is equipped with a circular clip on its outer periphery. In this way, the manifold conduit 62 is fluidly coupled with the return conduit 58. The manifold conduit 62 further has a threaded coupler on its outer periphery at the other side (lower side in drawing), and the threaded coupler is coupled with a pressure tap 53a of the intake pipe 53 by using a nut 53b. In this way, the manifold conduit 62 is fluidly coupled with the intake pipe 53. In the present example, the pressure sensor 60 is an integrated module having the sensing unit, the fluidic connection unit, and the electric wiring device.

The manifold conduit 62 may be screwed to the return conduit 58 and/or may be fitted to the intake pipe 53 with a knurled coupler. The manifold conduit 62 may be screwed directly to the intake pipe 53 without the nut 53b.

In the present configuration, the pressure sensor element 66 is configured to detect pressure in the manifold conduit 62 conducting fuel vapor and/or airflow from the third port 50 of the ejector 42 and the return conduit 58 toward the intake pipe 53.

Second Embodiment

Figure 11:
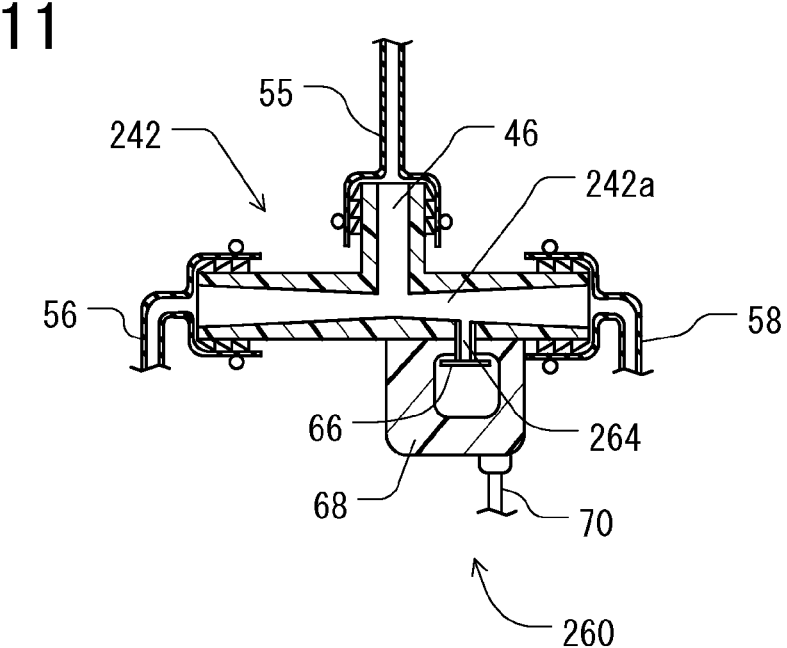
FIG. 11 is a diagram showing a pressure sensor according to a second embodiment.

As shown in FIG. 11, according to the present second embodiment, a pressure sensor 260 is integrated with an ejector 242 to form an integrated module. Specifically, the ejector 242 has a venturi passage 242a, which is internally branched to form a detection port 264. The pressure sensor element 66 is equipped to the detection port 264 and is configured to detect pressure in the venturi passage 242a. In the present configuration, the pressure sensor element 66 may be configured to detect pulsation caused in the engine 11.

For example, a failure may occur due to the detachment and/or the breakage of the ejector 242 and/or the return conduit 58. If detachment and/or the breakage occurs in the return conduit 58, the pulsation detected with the pressure sensor 260 may be attenuated due to the failure on the downstream of the pressure sensor 260.

Third Embodiment

Figure 12:
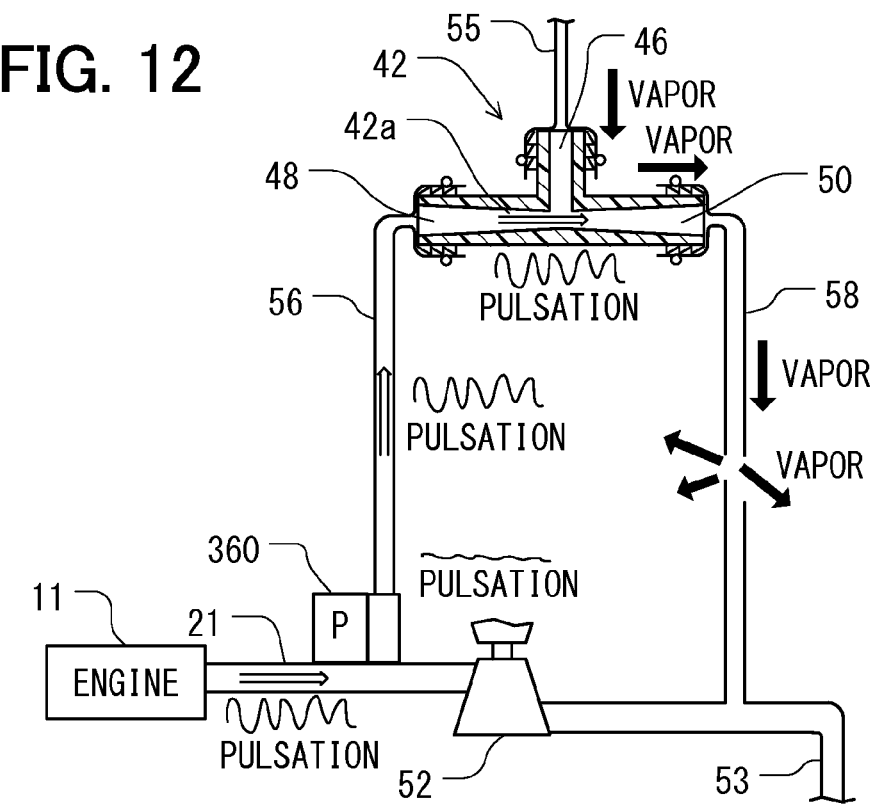
FIG. 12 is a diagram showing a pressure sensor according to a third embodiment.

As shown in FIG. 12, according to the present third embodiment, a pressure sensor 360 is equipped to the feeding conduit 56. The pressure sensor 360 may employ a configuration of the pressure sensor module similarly to the first embodiment, and the pressure sensor 360 may be coupled between the feeding conduit 56 and the intake pipe 21 on the downstream side of the supercharger 52.

If detachment and/or the breakage occurs in the ejector 42 and/or the return conduit 58, the pulsation detected with the pressure sensor 360 may be attenuated due to the failure on the downstream of the pressure sensor 360.

Other Embodiment

The pressure sensor is not limited to the integrated module. In the first embodiment, the return conduit 58 may be equipped with a tee (three-way passage) therethrough to branch the return conduit 58 to an additional passage in connection with the detection port of the pressure sensor 60. In the second embodiment, the ejector 242 may be equipped with a tee therethrough to branch the venturi passage 242a to an additional passage in connection with the detection port of the pressure sensor 260. In the first embodiment, the feeding conduit 56 may be equipped with a tee therethrough to branch the feeding conduit 56 to an additional passage in connection with the detection port of the pressure sensor 360. That is, in these examples, the pressure sensor may be equipped to the additional passage.

Materials of the components of the evaporative system in the above embodiments are examples and may be selected from various materials, such as resin, rubber, and/or metal.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An evaporative system for an internal combustion engine, the internal combustion engine having an intake pipe equipped with a supercharger to pressurize intake air, the evaporative system comprising:
   an ejector configured to draw intake airflow from a downstream of the supercharger to an upstream of the supercharger to cause a negative pressure to draw fuel vapor into the upstream of the supercharger;
   an ejector passage branched from the downstream of the supercharger through a first branched portion of the intake pipe and returned through the ejector to the upstream of the supercharger through a second branched portion of the intake pipe;
   a pressure sensor disposed in the ejector passage and configured to detect pressure in the ejector passage;
   a fuel vapor canister configured to absorb fuel vapor and to supply the fuel vapor to the ejector; and
   a controller coupled with the pressure sensor to obtain information representing a pressure detected by the pressure sensor, wherein
   the ejector has a first port, a second port, and a third port, the first port is in fluid communication with the fuel vapor canister, the second port is in fluid communication with the downstream of the supercharger, the third port is in fluid communication with the upstream of the supercharger,
   the ejector forms a venturi passage between the second port and the third port, wherein
   the ejector passage comprises a vacuum conduit, a feeding conduit, a return conduit, the vacuum conduit is coupled with the first port of the ejector and is in fluid communication with the fuel vapor canister, the feeding conduit is coupled with the second port of the ejector and is in fluid communication with the first branched portion of the intake pipe, and the return conduit is coupled with the third port of the ejector and an intake pipe end of the return conduit is in fluid communication with the second branched portion of the intake pipe,
   the pressure sensor is disposed on the intake pipe end of the return conduit
   the controller is configured to obtain pulsation information associated with a pressure detected by only the pressure sensor and to determine leakage in the ejector passage based on the pulsation information.

2. The evaporative system according to claim 1, wherein the controller is configured to compare an amplitude of at least one pulse included in the pulsation with an amplitude threshold and to determine leakage in the ejector passage when the amplitude is less than the amplitude threshold.

3. The evaporative system according to claim 1, wherein the controller is configured to determine the leakage in consideration of at least one of an upper peak of the pulse and a lower peak of the pulse.

4. The evaporative system according to claim 1, further comprising:
   a purge valve located between the fuel vapor canister and the first port, wherein the purge valve is configured to communicate the fuel vapor canister with the first port and to block the fuel vapor canister from the first port.

5. The evaporative system according to claim 4, further comprising:
   a first check valve located between the first port and the purge valve, wherein
   the first check valve is configured to restrict vapor from reverse-flowing from the ejector to the fuel vapor canister.

6. The evaporative system according to claim 4, further comprising:
   a second check valve located between the intake pipe and the purge valve, wherein
   the second check valve is configured to restrict vapor from reverse-flowing from the intake pipe to the fuel vapor canister.

7. The evaporative system according to claim 4, further comprising:
   a bypass valve located between the purge valve and the fuel vapor canister, wherein
   the bypass valve is configured to communicate the fuel vapor canister with an atmosphere and to block the fuel vapor canister from the atmosphere.

8. The evaporative system according to claim 1, wherein the evaporative system is configured to be operated in a boost purge mode where the internal combustion engine and the supercharger are placed in operation, the operation of supercharger causes airflow from an air intake port through the supercharger into the internal combustion engine, the airflow caused by the supercharger causes air flow through the ejector passage and the ejector, and the airflow through the ejector creates a venturi effect to cause fuel vapor to draw into the upstream of the supercharger,
   the controller is configured to retrieve information on a pulsation caused by the operation of the internal combustion engine and propagating through the intake pipe, the ejector passage and the ejector in the detected pressure by the pressure sensor during the boost purge mode and to determine the leakage.

* * * * *